United States Patent [19]

Frisch

[11] Patent Number: 5,212,713
[45] Date of Patent: May 18, 1993

[54] FAULT LOCATION ARRANGEMENT FOR DIGITAL TRANSMISSION SYSTEMS

[75] Inventor: David A. Frisch, Yarrawarra, Australia

[73] Assignees: Tasman Cable Company, Alexandria; OTC Limited, Sidney, both of Australia

[21] Appl. No.: 557,212

[22] Filed: Jul. 25, 1990

[30] Foreign Application Priority Data

Aug. 9, 1989 [AU] Australia .................. PJ5696

[51] Int. Cl.$^5$ .......................... H04B 17/02
[52] U.S. Cl. ............................. 375/3.1; 375/4; 370/13.1; 371/20.5
[58] Field of Search ............. 375/3.1; 455/9, 15, 455/23, 24, 601, 603, 606; 370/13.1, 15, 16; 371/20.1, 20.2, 20.3, 20.5

[56] References Cited

U.S. PATENT DOCUMENTS

| | | | |
|---|---|---|---|
| 4,266,183 | 5/1981 | Steensma | 359/177 |
| 4,317,010 | 2/1982 | Fillot | 370/13.1 |
| 4,402,075 | 8/1983 | Bargeton et al. | 370/13.1 |
| 4,499,600 | 2/1985 | Powell et al. | 455/9 |
| 4,534,064 | 8/1985 | Giacometti et al. | 455/601 |
| 4,635,260 | 1/1987 | Sestan | 375/3.1 X |
| 4,710,976 | 12/1987 | Wakabayashi et al. | 455/601 |
| 4,768,202 | 8/1988 | Lacroix et al. | 375/3.1 |
| 4,843,382 | 6/1989 | Oda et al. | 455/601 X |
| 4,899,043 | 2/1990 | Mochizuki et al. | 455/601 |
| 4,980,887 | 12/1990 | Dively et al. | 371/20.2 |

*Primary Examiner*—Curtis Kuntz
*Assistant Examiner*—T. Ghebretinsae
*Attorney, Agent, or Firm*—Spencer, Frank & Schneider

[57] ABSTRACT

A fault location arrangement for either electrical or optical digital transmission systems is provided by a distinct diagnostic signal at each of a series of regenerators which is used to modulate data signals. The modulated data signals are then recovered by demodulation and analyzed to determine the status of each regenerator. Diversion of signals by "loop-back" at each regenerator is also provided for.

6 Claims, 4 Drawing Sheets

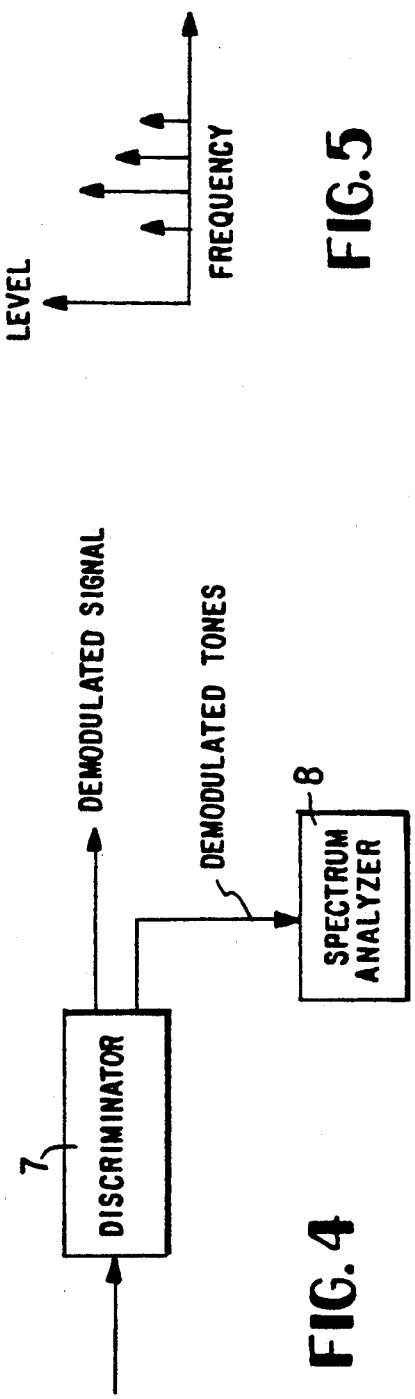
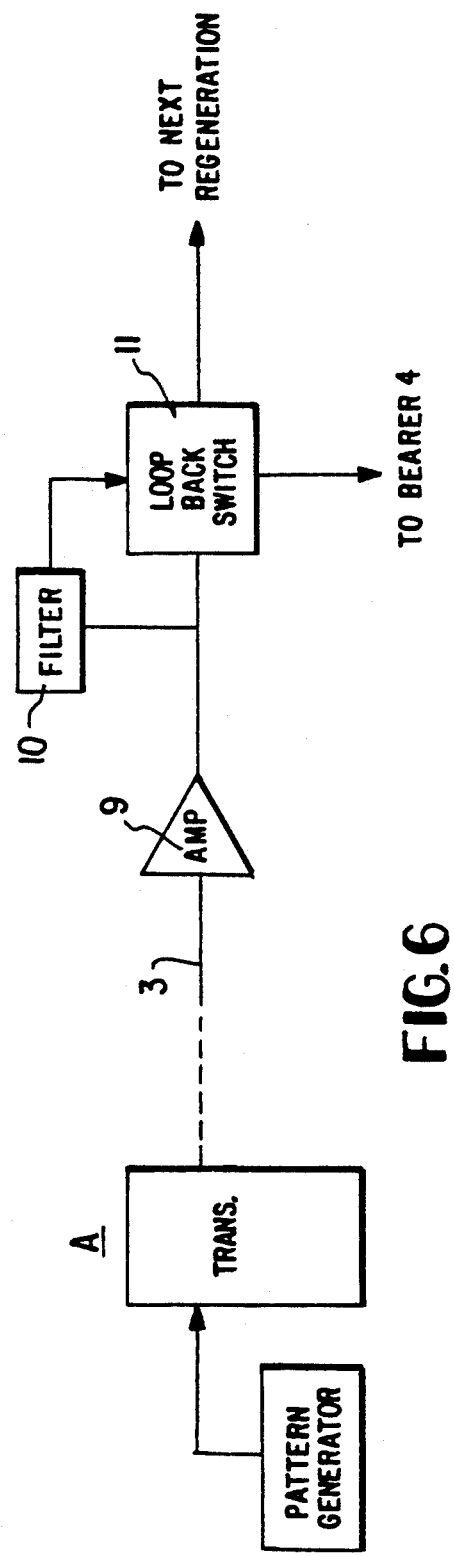

FAULT LOCATION ARRANGEMENT FOR DIGITAL TRANSMISSION SYSTEMS

BACKGROUND OF THE INVENTION

1. Field of the Invention

This invention relates to digital transmission systems, in particular, though not exclusively, submarine digital transmission systems.

2. Background Information

Such systems include a first terminal and a second terminal each having a signal transmit means and a signal receive means, a first transmission bearer and a second transmission bearer, the first transmission bearer conveying signals from the signal transmit means of one terminal to the signal receive means of the other terminal, and the second transmission bearer conveying signals from the signal transmitter of the other terminal to the receive terminal of the said one terminal, each bearer having a plurality of spaced regenerators to restore the original shape of a pulse signal transmitted from a signal transmit means of a terminal.

Such transmission systems require a fault location arrangement to locate faults in remote regenerators and in sections of bearer adjacent thereto.

Techniques for locating faults are known and may comprise an arrangement in which a command signal is sent from a terminal of the system which addresses a particular regenerator. The regenerator responds with a status message or an action such as switching a laser or activating a loop-back circuit.

These known arrangements are relatively complicated and require complex circuitry.

SUMMARY OF THE INVENTION

It is therefore an object of the present invention to provide a relatively simple fault locating arrangement for a digital transmission system of the aforementioned type.

A further object of the present invention is to provide a fault locating arrangement for a digital transmission system of the aforementioned type, which is capable of performing tests during service to detect any degradation of signal strength which may indicate an impendent major breakdown.

According to a first aspect of the invention, in a non re-timed digital transmission system comprising a first terminal and a second terminal each of which includes a signal transmit means and a signal receive means, a first transmission bearer and a second transmission bearer, the first transmission bearer conveying signals from the signal transmit means of one terminal to the signal receive means of the other terminal, and the second transmission bearer conveying signals from the signal transmit means of the other terminal to the signal receive means of the said one terminal, each bearer having a plurality of spaced regenerators to restore the original shape of a pulse signal transmitted from a signal transmit means, a method of locating faults comprising the steps of providing a distinct diagnostic signal at each regenerator, modulating regenerated data with said diagnostic signal to produce pulse width modulation, recovering the so modulated signals in demodulation means at said signal receive means, the recovered signals indicating the status of the associated regeneration and bearer section adjacent thereto.

A further object of the present invention is to provide a supervisory arrangement for initiating a loop-back at a regenerator without the need for complex circuitry. By "loop-back" is meant the regenerated signals in a regenerator that are transmitted from a terminal on one bearer, are diverted at the regenerator onto the other bearer and are received in the receive equipment of the same terminal. The Bit-error-ratio may then be measured and used to check the performance of the regenerator under test.

According to a further aspect of the invention, in a digital transmission system comprising a first terminal and a second terminal each of which includes a signal transmit means and a signal receive means, a first transmission bearer and a second transmission bearer, the first transmission bearer conveying signals from the signal transmit means of one terminal to the signal receive means of the other terminal, and the second transmission bearer conveying signals from the signal transmit means of the other terminal to the signal receive means of the said one terminal, each bearer having a plurality of spaced regenerators to restore the original shape of a pulse signal transmitted from a signal transmit means, a method for diverting regenerated signals that are transmitted from a terminal on one bearer onto the other bearer to return said regenerated signals to the signal receive means of that terminal, said method including the steps of transmitting a repetitive pattern from the transmit means of a terminal whereby detectable signals of a predetermined frequency are selectively generated, detecting a said detectable signal with filter means in a regenerator with which a diverting circuit is activated in the regenerator to divert regenerated signals from one bearer to the other.

BRIEF DESCRIPTION OF THE DRAWINGS

In order that the invention may be readily carried into effect, embodiments thereof will now be described in relation to the drawings, in which:

FIG. 4 is a block diagram of the arrangement at the signal receive means of the terminals;

FIG. 5 is a graph of the level of diagnostic signals demodulated at the signal receive means of a terminal;

FIG. 6 is a block diagram of an arrangement of the present invention to divert regenerated signals at a regenerator onto the other bearer for loop-back tests.

DESCRIPTION OF THE PREFERRED EMBODIMENT(S)

Figure 1:
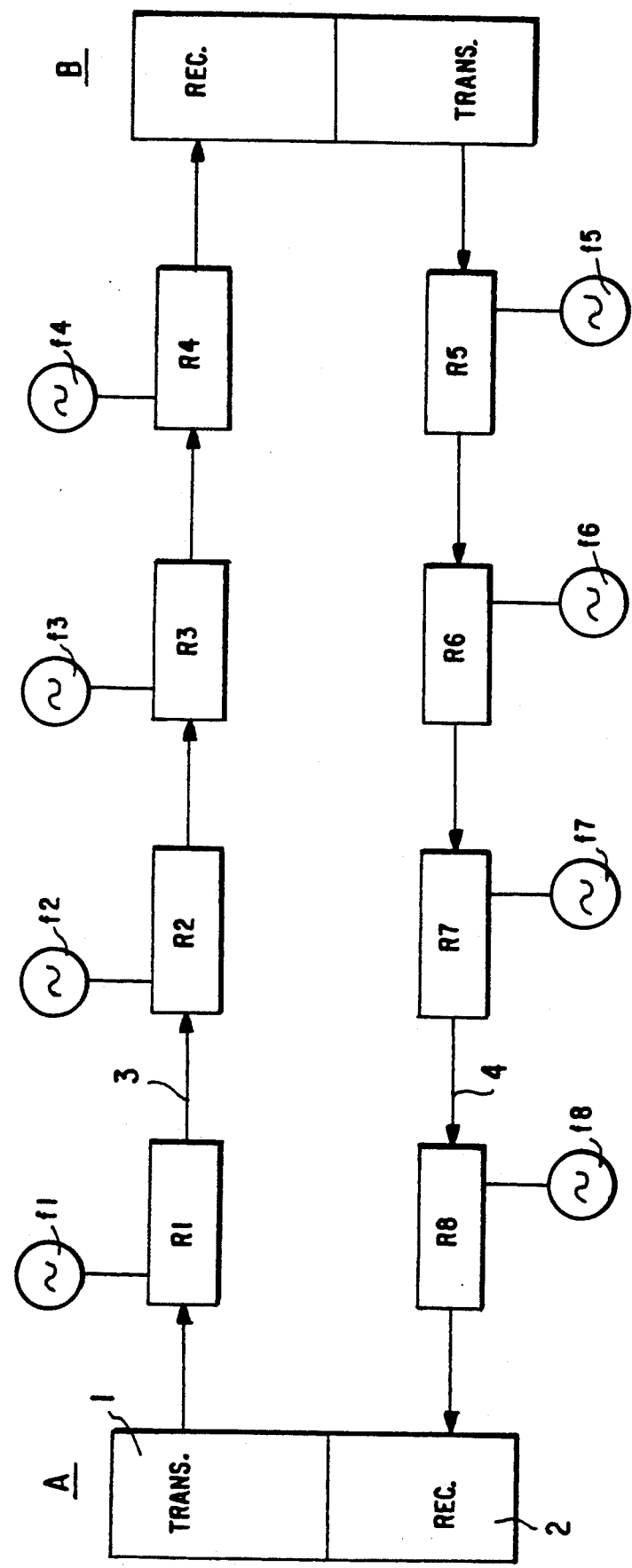
FIG. 1 is a block diagram of a non re-timed ditigal transmission system incorporating the fault location arrangement of the present invention.
Figure 2:
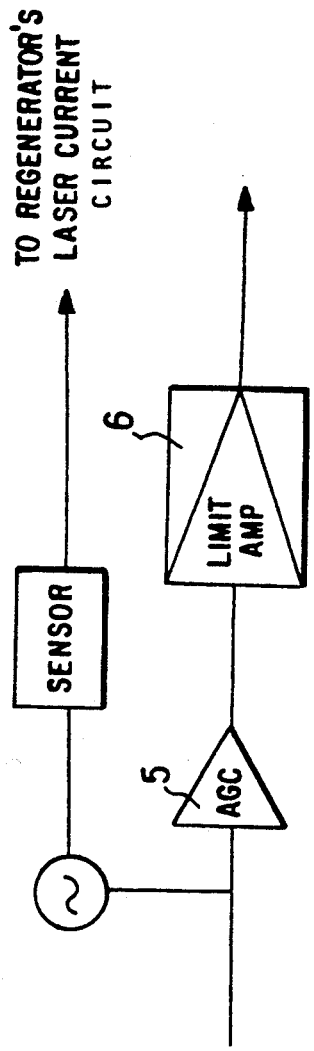
FIG. 2 is a block diagram of part of a regeneration shown in the system of FIG. 1.

Referring to FIG. 1 of the drawings the transmission system comprises two terminals A and B each of which include a signal transmit means 1 and signal receive means 2. The terminals are linked by a Send optical bearer 3 and a Receive optical bearer 4, over which a main data signal, having typically a 0–600 MHz bandwidth, is transmitted from the terminals. At intervals along each optical bearer are interposed four regenerators R1 to R4 and R5 to R8. Incorporated in each regenerator is a relatively low frequency oscillator f1 to f8 each of a different frequency. Typically, oscillator f1 has a frequency of 21 KHz, oscillator f2 a frequency of 22 KHz and so on. Each regenerator R1 to R8 includes an AGC amplifier 5 and a decision circuit 6 in the form of a limiting amplifier (see FIG. 2). The output of the oscillator (f1–f8) is injected prior to the AGC amplifier 5 to produce pulse width modulated data whose modulation level depends on the data signal input level and therefore contains information as to the state of the input signal. Alternatively, the output of the oscillator (f1–f8) could be injected after the AGC amplifier 5 in which case the oscillator level is linked to the AGC voltage. Further, the oscillator (f1–f8) may be additionally modulated to provide information concerning other parameters of the regenerator, such as, for example, the "health" of the regenerator's laser (not shown) which is indicated by monitoring current drawn by this element. The oscillator may be additionally modulated by a sensor means (not shown) arranged to monitor the laser current. At the signal receive means 2 of each terminal there is included a pulse width discriminator means 7 which recovers the data signal and the signal containing the level information, the latter being applied to a spectrum analyser means 8.

Figure 3:
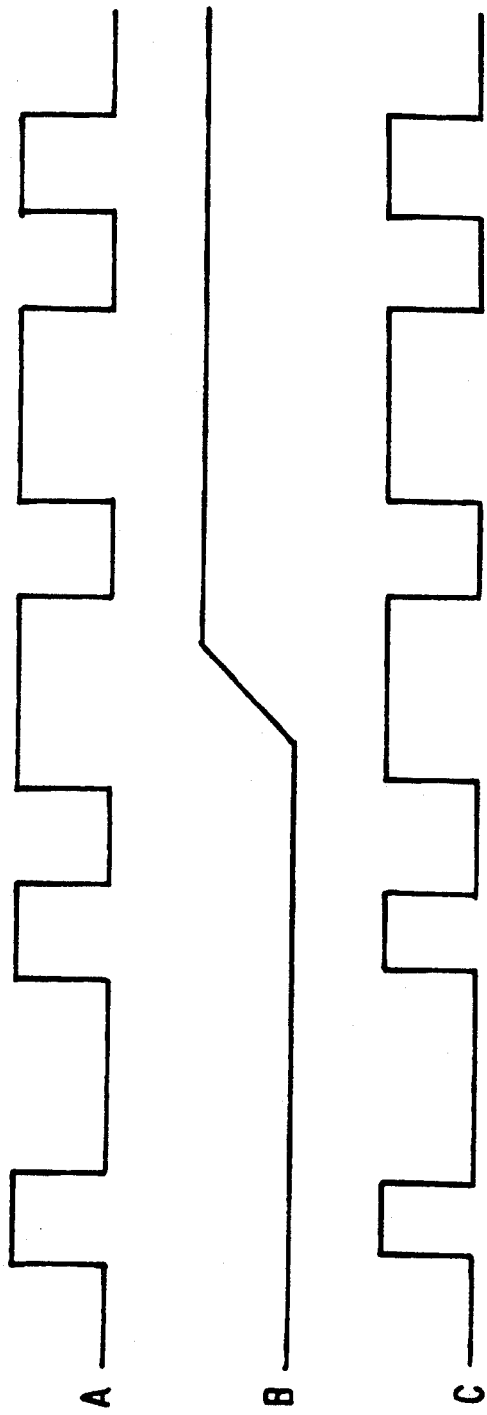
FIG. 3 is a diagram of wave forms of:
(A) the normal data,
(B) the diagnostic signal injected into each regenerator, and
(C) the normal data modulated with the diagnostic signal.

In operation, pulse width modulation of transmitted data signal is achieved by adding a relatively low level of tone generated in oscillator f1–f8 to the data signal prior to the decision circuit 6. This has the effect of changing the pulse width (see FIG. 3). Because the data transition is not re-timed in subsequent regenerators, the pulse width modulated signals pass through those regenerators. At the signal receive means 2, the signals containing the level information recovered in pulse width discriminator 7 are coupled to spectrum analyser means 8 where modulation levels of each regenerator are measured and displayed. These signal levels (see FIG. 5) indicate the status of the regenerator (R1–R8) associated with each frequency and its adjacent bearer section. In the event of a fault, the failed section can be ascertained by noting which frequency is missing. In the case of a total failure, there would be no signal data to modulate, and only the tone would be transmitted.

Referring now to the arrangement shown in FIG. 6, the regenerator comprises an amplifier 9, a narrow band filter 10 and a loop-back switch 11 arranged to switch the regenerated signals onto the other bearer.

In operation, in order to transmit a command signal to a selected regenerator (R1–R8) and cause it to switch into a loop-back mode, a repetitive pattern of a preselected number of bits is transmitted. This pattern may be used for testing the performance of the resulting chain of regenerators.

A pattern of n bits at a line rate of B produces a series of tones, the lowest of which is at B/n and has a relative power of 1/n. For a line rate of 591 Mbauds:
  96 bits produces 6158 kHz
  104 bits produces 5685 kHz A pattern length is chosen to produce a selective tone which can be passed by filter 11 at the regenerator (R1–R8) under test to trigger loop-back switch 11.

Filter 10 may be a filter such as, for example, a crystal filter or a phase lock load detector. The bandwidth of the filter 10 should be such that the code noise of normal data does not trigger the loop-back switch 11.

Figure 7:
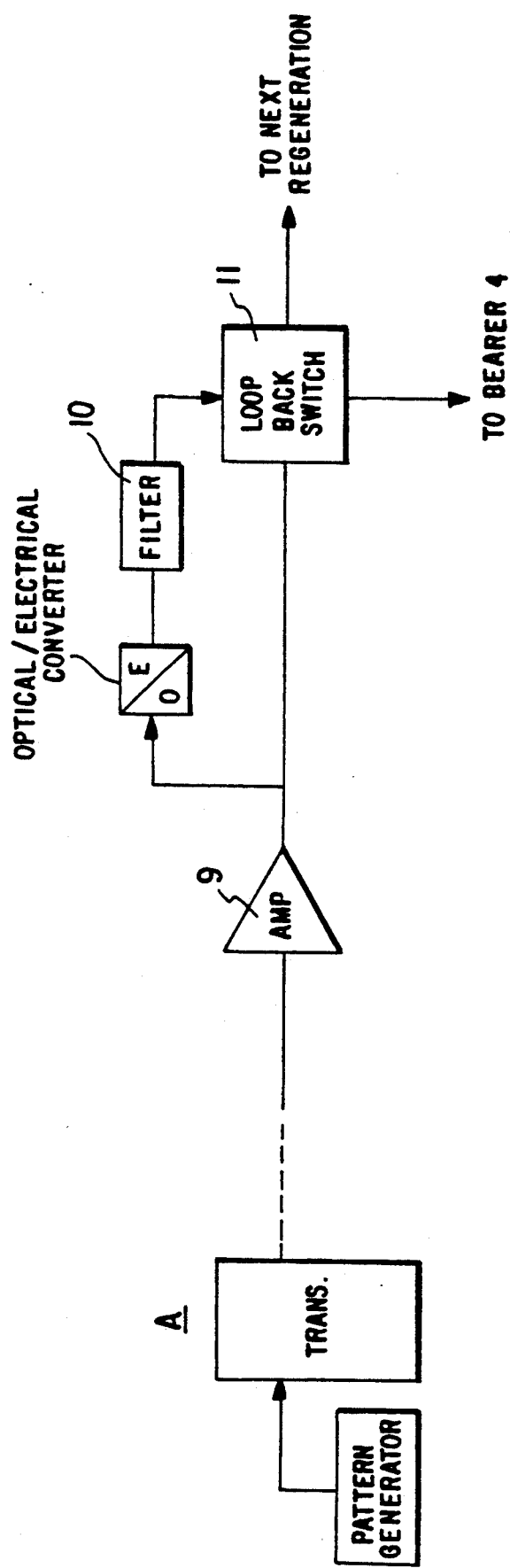
FIG. 7 is a block diagram showing an optical/electrical converter in the arrangement according to an embodiment of the invention.

It will be understood that the regenerator shown in FIG. 6 can be part of an electrical or an optical transmission system, and therefore amplifier 9 can be either an electric amplifier or an optical amplifier. In the case of an optical transmission system, a small part of the amplified optical signal is split off, converted in a conventional optical/electrical converter means as shown in FIG. 7 and coupled into filter 10.

While the present invention has been described with regard to many particulars, it is understood that equivalents may be readily substituted without departing from the scope of the invention.

I claim:

1. In a non-re-timed digital transmission system comprising a first terminal and a second terminal each of which includes a signal transmit means and a signal receive means, a first transmission bearer and a second transmission bearer, the first transmission bearer conveying signals from the signal transmit means of one terminal to the signal receive means of the other terminal, and the second transmission bearer conveying signals from the signal transmit means of the other terminal to the signal receive means of the said one terminal, each bearer having a plurality of spaced regenerators to restore the original shape of a pulse signal transmitted from a signal transmit means, a method of locating faults by diverting regenerated signals that are transmitted from a terminal on one bearer onto the other bearer to return said regenerated signals to the signal receive means of that terminal, said method including the steps of:

transmitting a repetitive pattern from the transmit means of a terminal to selectively generate detectable signals of a predetermined frequency;
  detecting said detectable signals of a predetermined frequency with filter means in a regenerator, said filter means being tuned to pass said detectable signals to a diverting circuit in the regenerator; and
  activating said diverting circuit in the regenerator to divert regenerated signals from one bearer to the other.

2. A method as claimed in claim 1, wherein said transmission bearers are optical bearers.

3. The method of claim 1, wherein said regenerator is part of an optical transmission system, and further comprises optical amplifier means wherein a small part of the amplified optical signal is split off, converted in a conventional optical/electrical converter means and coupled into a filter.

4. A non-re-timed digital transmission system comprising a first terminal and a second terminal each of which includes a signal transmit means and a signal receive means, a first transmission bearer and a second transmission bearer, the first transmission bearer conveying signals from the signal transmit means of one terminal to the signal receive means of the other terminal, and the second transmission bearer conveying signals from the signal transmit means of the other terminal to the signal receive means of the said one terminal, each bearer having a plurality of spaced regenerators to restore the original shape of a pulse signal transmitted from a signal transmit means, and means for locating faults by diverting regenerated signals that are transmitted from a terminal on one bearer onto the other bearer to return said regenerated signals to the signal receive means of that terminal;

wherein said means for locating faults comprises:

means for transmitting a repetitive pattern from the transmit means of a terminal to selectively generate detectable signals of a predetermined frequency;

means for detecting said detectable signals of a predetermined frequency with filter means in a regenerator, said filter means being tuned to pass said detectable signals to a diverting circuit in the regenerator; and means for activating said diverting circuit in the regenerator to divert regenerated signals from one bearer to the other.

5. The system according to claim 4, wherein said transmission bearers are optical bearers.

6. The system according to claim 4, wherein said regenerator is part of an optical transmission system, and further comprises optical amplifier means wherein a small part of the amplified optical signal is split off, converted in a conventional optical/electrical converter means and coupled into a filter.

* * * * *